United States Patent
Yee et al.

(10) Patent No.: US 10,502,956 B2
(45) Date of Patent: Dec. 10, 2019

(54) SYSTEMS AND METHODS OF REDUCING TEMPERATURE GRADIENTS IN OPTICAL WAVEGUIDES

(71) Applicant: Microsoft Technology Licensing, LLC, Redmond, WA (US)

(72) Inventors: Dawson Yee, Medina, WA (US); Lucas Warren Schmidt, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 151 days.

(21) Appl. No.: 15/634,040

(22) Filed: Jun. 27, 2017

(65) Prior Publication Data
US 2018/0373035 A1    Dec. 27, 2018

(51) Int. Cl.
*G02B 27/01* (2006.01)
*F21V 8/00* (2006.01)
*G02B 7/00* (2006.01)

(52) U.S. Cl.
CPC ......... *G02B 27/0149* (2013.01); *G02B 6/005* (2013.01); *G02B 6/0085* (2013.01); *G02B 7/008* (2013.01); *G02B 27/0101* (2013.01); *G02B 27/017* (2013.01); *G02B 2027/0125* (2013.01)

(58) Field of Classification Search
CPC .. G02B 27/0149; G02B 7/008; G02B 27/017; G02B 6/0085; G02B 27/0101; G02B 6/005; G02B 2027/0125; G02B 27/0081
See application file for complete search history.

(56) References Cited

U.S. PATENT DOCUMENTS

| | | | |
|---|---|---|---|
| 5,260,828 A | 11/1993 | Londono et al. | |
| 6,262,844 B1 | 7/2001 | Soskind | |
| 6,865,318 B1 | 3/2005 | Hayden et al. | |
| 8,693,185 B2 | 4/2014 | Dunn et al. | |
| 2002/0057884 A1* | 5/2002 | Hirose | G02B 6/30 385/137 |
| 2005/0089282 A1* | 4/2005 | Oikawa | G02B 7/008 385/92 |
| 2010/0284085 A1* | 11/2010 | Laakkonen | G02B 6/12007 359/575 |

(Continued)

FOREIGN PATENT DOCUMENTS

| | | |
|---|---|---|
| DE | 102014015024 A1 | 4/2016 |
| WO | 2005079129 A1 | 8/2005 |

OTHER PUBLICATIONS

Che, et al., "Fabrication of Surface Relief Grating with Second-Order Nonlinearity Using Urethane-Urea Copolymer Films", In Japanese Journal of Applied Physics, vol. 38, No. 11, Nov. 1999, 2 pages.

(Continued)

*Primary Examiner* — Kimberly N. Kakalec
(74) *Attorney, Agent, or Firm* — Ray Quinney & Nebeker P.C.; John O. Carpenter

(57) ABSTRACT

A system for displaying visual information to a user includes a waveguide and a thermal management device. The waveguide has a front surface, a rear surface, and a dual expansion grating area to guide light through the waveguide. The thermal management device is positioned at least partially overlapping the dual expansion grating area and in thermal communication with the dual expansion area.

20 Claims, 6 Drawing Sheets

(56) References Cited

U.S. PATENT DOCUMENTS

| | | | |
|---|---|---|---|
| 2011/0019258 A1* | 1/2011 | Levola | G02B 6/0035 |
| | | | 359/238 |
| 2011/0026128 A1* | 2/2011 | Baker | G02B 6/0028 |
| | | | 359/630 |
| 2015/0229897 A1 | 8/2015 | Mukawa | |
| 2015/0277125 A1 | 10/2015 | Hirano et al. | |
| 2016/0139328 A1* | 5/2016 | Hikmet | G02B 6/0035 |
| | | | 362/84 |
| 2016/0363728 A1 | 12/2016 | Wang et al. | |
| 2017/0038593 A1 | 2/2017 | Travers | |
| 2017/0097509 A1 | 4/2017 | Yoshida | |
| 2018/0239131 A1* | 8/2018 | Cornelius | A61F 9/025 |

OTHER PUBLICATIONS

"International Search Report and Written Opinion Issued in PCT Application No. PCT/US2018/034260", dated Sep. 6, 2018, 12 Pages.

\* cited by examiner

SYSTEMS AND METHODS OF REDUCING TEMPERATURE GRADIENTS IN OPTICAL WAVEGUIDES

CROSS-REFERENCE TO RELATED APPLICATIONS

N/A

BACKGROUND OF THE DISCLOSURE

Augmented reality (AR) and mixed reality (MR) display systems allow a user to experience visual information presented from a computer simultaneously with ambient light from the user's surroundings. One method for allowing a user to view their surroundings while receiving additional visual information introduced in their field of view is an optical waveguide. A waveguide allows ambient light to reach a user's eyes, while also allowing light from a display device to be directed to the user's field of view and combined with the ambient light.

Directing the light from the display device through the waveguide to the user includes several optical elements, such as diffractive or holographic elements like in coupling and out coupling gratings. The optical performance of diffractive elements is sensitive to the geometry of, within and between, the gratings. Thermal expansion causing relative movement of or other changes to the gratings, therefore, can have a detrimental effect on the optical performance of a waveguide. Differential thermal expansion of the gratings can alter the intended optical performance of the image presented to the user.

SUMMARY

In some embodiments, a system for displaying visual information to a user includes a waveguide and a thermal management device. The waveguide has a front surface, a rear surface, and a dual expansion grating area to guide light through the waveguide. The thermal management device is positioned at least partially overlapping the dual expansion grating area and in thermal communication with the dual expansion area.

In other embodiments, a system for displaying visual information to a user includes a head-mounted display frame, a waveguide supported by the head-mounted display frame, a display engine in optical communication with the waveguide, and a heat spreader. The waveguide has a front surface, a back surface, and a dual expansion grating area to guide light through the waveguide. The display engine is positioned to communicate a display light into the dual expansion grating area of the waveguide. The heat spreader is positioned at least partially overlapping the dual expansion grating area, and in thermal communication with the dual expansion grating area while not contacting the dual expansion grating area.

In yet other embodiments, a method of displaying visual information to a user includes communicating a display light into a waveguide having a dual expansion grating area, changing a first temperature of a first portion of the dual expansion grating area, inducing a thermal gradient such that a second portion of the dual expansion grating area has a second temperature that is different from the first temperature, and reducing the thermal gradient of the first temperature of the first portion and the second temperature of the second portion.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 6-1 is a side cross-sectional view an embodiment of a waveguide and thermal management device, according to at least one embodiment of the present disclosure;

FIG. 6-2 is a side cross-sectional view of the embodiment of a waveguide of FIG. 6-1 illustrating radiative thermal management, according to at least one embodiment of the present disclosure;

FIG. 6-3 is a side cross-sectional view of the embodiment of a waveguide of FIG. 6-1 illustrating reflective thermal management, according to at least one embodiment of the present disclosure;

DETAILED DESCRIPTION

This disclosure generally relates to devices, systems, and methods for providing visual information to a user. More specifically, the present disclosure relates to thermal management of an optical waveguide providing visual information to a user. In some embodiments, visual information may be provided to a user by a near-eye display. A near-eye display may be any display that is positioned near a user's eye, either to supplement a user's view of their surroundings, such as augmented or mixed reality devices, or to replace the user's view of their surroundings, such as virtual reality devices. In some embodiments, an augmented reality or mixed reality device may be a head-mounted display (HMD) that presents visual information to a user overlaid on the user's view of their surroundings. For example, the visual information from the HMD may be combined with ambient or environment light to overlay visual information, such as text or images, on a user's surroundings.

In some embodiments, the user's field of view may be at least partially encompassed by a waveguide through which the user views their surroundings. The optical waveguide may direct display light from a light engine to the user's field of view. The optical waveguide may expand the display light through a dual expansion grating area before out coupling the light. Upon out coupling the light, the optical waveguide may combine the visual information of the display light with ambient light from the user's surroundings to deliver the visual information to the user. Overlaying the visual information from the HMD on the user's surroundings may require precise generation and positioning of the visual information relative to the user's eyes. Thermal gradients in the dual expansion grating area of the optical waveguide may introduce artifacts in guided light that adversely affect the visual information provided to the user.

Figure 1:
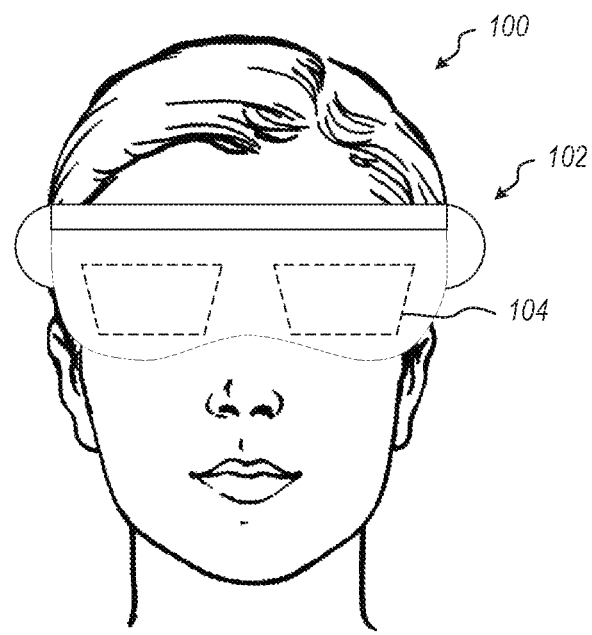
FIG. 1 is a front view of an embodiment of a head-mounted display (HMD) including a waveguide, according to at least one embodiment of the present disclosure.

FIG. 1 is a front view of a user 100 wearing a HMD 102. In some embodiments, the HMD 102 may have an optical waveguide 104 positioned near the user 100 to direct visual information to the user 100. The HMD 102 may include a single optical waveguide 104, a separate optical waveguide 104 for each of the user's eyes (i.e., two waveguides 104), or more than two optical waveguides 104 to provide visual information over a larger field of view.

In some embodiments, the waveguide 104 may include optical grating structures, such as surface relief gratings (SRG), to extract the visual information from the total internal reflection of the waveguide 104. The SRG may outcouple visual information that is provided to the waveguide 104 by one or more electronic components of the HMD 102. In some embodiments, the HMD 102 may include one or more processors, storage devices, power supplies, audio devices, display devices, cameras, communication devices, or combinations thereof, that receive, collect, store, process, or calculate information that is provided to the user.

Figure 2:
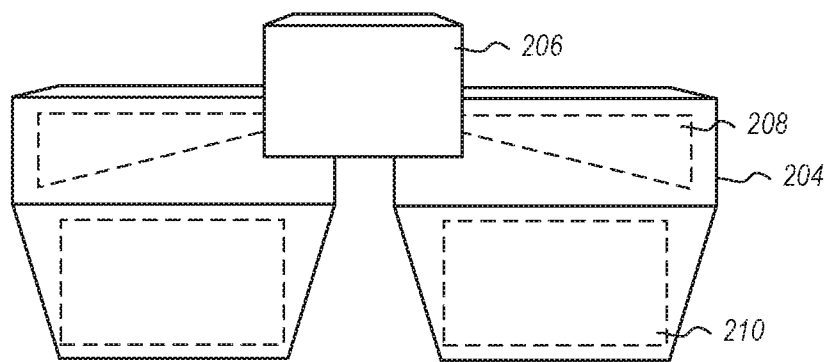
FIG. 2 is a front view of an embodiment of a waveguide having a dual expansion grating area, according to at least one embodiment of the present disclosure.

FIG. 2 is a front view of an embodiment of a waveguide 204 in communication with a light engine 206. In some embodiments, the waveguide 204 may be a waveguide stack. For example, the waveguide 204 may include a plurality of waveguides oriented parallel to one another. The waveguide stack may display visual information in a plurality of wavelengths (e.g., different wavelength ranges on the different waveguides) that may be combined into a broader spectrum color image than any of the individual waveguides. While the present disclosure may refer to the waveguide 204 in the singular, it should be understood that a HMD or other near-eye display may include more than one waveguide and/or a waveguide stack and the thermal management devices and methods described herein may be equally applicable to a group of waveguides.

In some embodiments, the light engine 206 may be any display device capable of directing a display light into the waveguide 204. The waveguide 204 may include an incouple grating that receives a display light from the light engine 206. The display light may be reflected internally within the waveguide 204 and may be directed through a dual expansion grating area 208. The display light may be out coupled in a viewing area 210 through which a user may view the visual information and/or the user's surroundings.

In some embodiments, the dual expansion grating area 208 may be positioned outside of a field of view of the user. In other embodiments, the dual expansion grating area 208 may be positioned within at least part of the housing of the HMD (such as the HMD 102 shown in FIG. 1) and may be obstructed from the field of view of the user. In at least one embodiment, the visual information is not presented or visible to the user within the dual expansion grating area 208. The visual information that is presented to the user through the viewing area 210, however, may be affected by the geometry of the dual expansion grating area 208. A thermal gradient across the dual expansion grating area 208 may introduce different amounts of thermal expansion of the waveguide 204 across the dual expansion grating area 208. Unintended spacing between the gratings in the dual expansion grating area 208 may alter the optical behavior of the dual expansion grating area 208 and alter the visual information presented to the user in the viewing area 210.

In some embodiments, a thermal gradient in the dual expansion grating area 208 may produce color distortion during the transmission of the visual information presented to the user (e.g., the color of a portion of the visual information may be different than the original input image). In other embodiments, a thermal gradient in the dual expansion grating area 208 may produce brightness changes during the transmission of the visual information (e.g., a portion of the image may be brighter or darker than intended).

Figure 3:
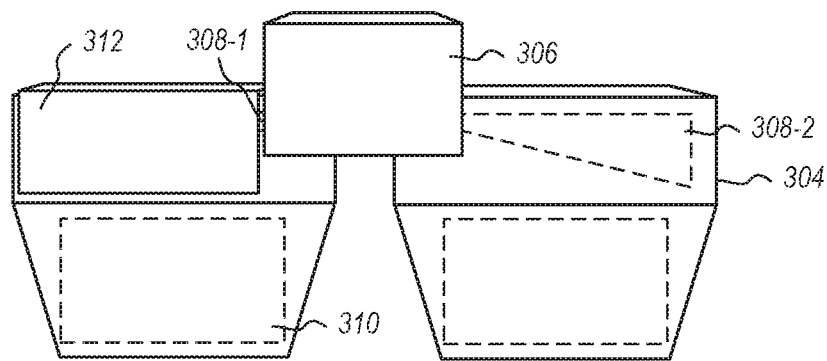
FIG. 3 is a front view of an embodiment of a waveguide with a thermal management device overlapping a dual expansion grating area, according to at least one embodiment of the present disclosure.

FIG. 3 is a front view of an embodiment of a waveguide 304 with a thermal management device 312. The thermal management device 312 may assist reducing the thermal gradient in the waveguide 304, particularly in the dual expansion grating area 308-1, 308-2. FIG. 3 illustrates the thermal management device 312 positioned overlapping a first dual expansion grating area 308-1 of the two dual expansion grating areas of the waveguide 304, for comparison. In some embodiments, a second thermal management device 312 may be positioned overlapping the second dual expansion grating area 308-2.

In some embodiments, the thermal management device 312 may be optically transparent. For example, the thermal management device 312 may transmit greater than 5% of light in the visible spectrum. In other embodiments, the thermal management device 312 may be opaque. For example, the thermal management device 312 may transmit less than 5% of light in the visible spectrum. The thermal management device 312 may have a thickness that is at least partially relative to the heat capacity of a material in the thermal management device. For example, the thermal management device 312 may have a thermal mass greater than the waveguide 304 in the region in which the thermal management device 312 overlaps the waveguide 304.

In some embodiments, the thermal management device 312 may have a thickness in a range having an upper value, a lower value, or upper and lower values including any of 0.20 mm, 0.22 mm, 0.24 mm, 0.26 mm, 0.28 mm, 0.30 mm, 0.32 mm, 0.34 mm, 0.36 mm, 0.38 mm, 0.40 mm, 0.42 mm, 0.44 mm, 0.46 mm, 0.48 mm, 0.50 mm, or any values therebetween. For example, the thermal management device 312 may have a thickness greater than 0.20 mm. In other examples, the thermal management device 312 may have a thickness less than 0.50 mm. In yet other examples, the thermal management device 312 may have a thickness between 0.20 mm and 0.50 mm. In further examples, the thermal management device 312 may have a thickness between 0.25 mm and 0.40 mm.

A thermal gradient in the waveguide 304 may be induced by exposure to heat thermal energy from the light engine 306 or other electronic components in a HMD. For example, any nearby electronic component that generates thermal energy during use may introduce thermal energy to the waveguide 304 and induce a thermal gradient. The packaging of electronic components may vary from device to device, but a power supply, processor, storage device, memory module, communication device, or other electronic components may be positioned in proximity to the waveguide. In other examples, the thermal gradient may be introduced by thermal energy from a user, such as body heat, or from the environment, such as exposure to direct sunlight.

In some embodiments, the thermal management device 312 may reduce a thermal gradient in the waveguide 304 by changing the distribution of thermal energy in the waveguide 304. In other embodiments, the thermal management device 312 may reduce a thermal gradient in the waveguide 304 by reducing the exposure of the waveguide 304 to thermal energy from other components.

In some embodiments, the thermal management device 312 may overlap substantially all of a dual expansion grating area 308-1, 308-2 without inhibiting visibility of the viewing area 310. In other embodiments, the thermal management device 312 may overlap less than the entire dual expansion grating area 308-1, 308-2. For example, FIG. 4 is a front view of another embodiment of a waveguide 404 with a partial thermal management device 412 according to the present disclosure.

In some embodiments, the thermal management device 412 may overlap a portion of the dual expansion grating area 408 in a range having an upper value, a lower value, or upper and lower values including any of 5%, 10%, 20%, 30%, 40%, 50%, 60%, 70%, 80%, 90%, 100%, or any values therebetween. For example, the thermal management device 412 may overlap at least 5% of the dual expansion grating area 408. In other examples, the thermal management device 412 may overlap at least 20% of the dual expansion grating area 408. In yet other examples, the thermal management device 412 may overlap at least 50% of the dual expansion grating area 408. In further examples, the thermal management device 412 may overlap between 10% and 90% of the dual expansion grating area 408. In yet further examples, the thermal management device 412 may overlap between 25% and 75% of the dual expansion grating area 408.

In some embodiments, the thermal management device 412 may be positioned at an upper edge 414 of the waveguide 404 and may extend downward toward the viewing area 410. In other embodiments, the thermal management device 412 may be positioned along an outer edge 416 of the waveguide 402 (e.g., the edge furthest from the light engine 406) and overlapping at least a portion of the dual expansion grating area 408. In yet other embodiments, the thermal management device 412 may be positioned in contact with the light engine 406 and overlapping at least a portion of the dual expansion grating area 408.

Figure 4:
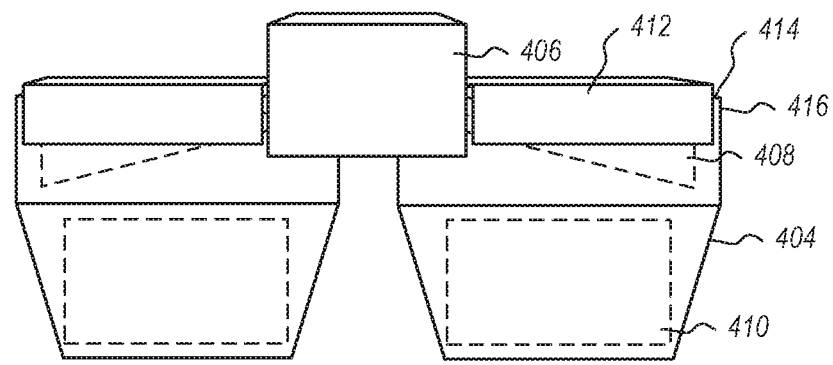
FIG. 4 is a front view of another embodiment of a waveguide with a thermal management device overlapping a portion of a dual expansion grating area, according to at least one embodiment of the present disclosure.
Figure 5:
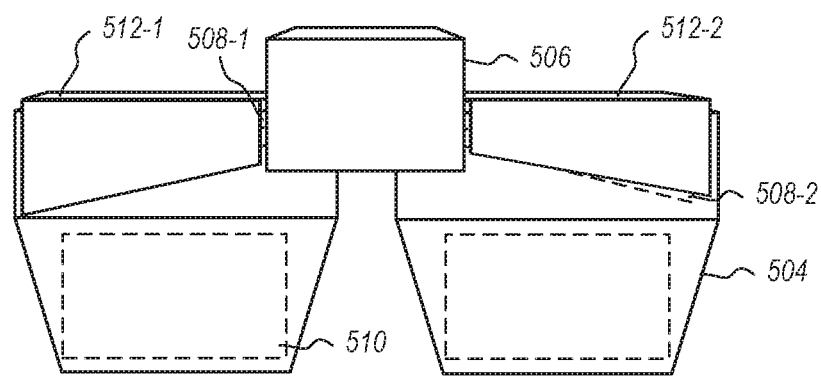
FIG. 5 is a front view of another embodiment of a waveguide with a thermal management device geometrically matched to a dual expansion grating area, according to at least one embodiment of the present disclosure.

While FIG. 3 and FIG. 4 depict embodiments of a thermal management device 312, 412 with a substantially rectangular geometry overlapping the dual expansion grating area 308, 408, other embodiments of a thermal management device may have other shapes and/or geometries. For example, FIG. 5 illustrates an embodiment of a waveguide 504 with a first thermal management device 512-1 and a second thermal management device 512-2.

In some embodiments, a thermal management device, such as the first thermal management device 512-1, may have a geometry that is complimentary to the dual expansion grating area. For example, the first thermal management device 512-1 may overlap substantially all of the first dual expansion grating area 508-1 without extending beyond the first dual expansion grating area 508-1 toward to the viewing area 510. In some examples, a lower edge of the first thermal management device 512-1 may be complimentary to the lower edge of the first dual expansion grating area 508-1.

In other embodiments, a thermal management device may share a similar or same geometry as the dual expansion grating area while overlapping less than the entire dual expansion grating area. For example, the second thermal management device 512-2 may have a shape similar to the second dual expansion grating area 508-2, but may have at least one dimension (e.g., the vertical dimension) that is less than that of the second dual expansion grating area 508-2. In such embodiments, the portion of the second dual expansion grating area 508-2 that is not overlapped by the second thermal management device 512-2 may be of a constant dimension. In other words, the lower edge of the second thermal management device 512-2 may be a constant distance from the lower edge of the second dual expansion grating area 508-2. In other embodiments, the portion of the second dual expansion grating area 508-2 that is not overlapped by the second thermal management device 512-2 may be of a varying dimension. For example, at least a portion of the lower edge of the second thermal management device 512-2 may be curved and the lower edge of the second dual expansion grating area 508-2 may be straight. In another example, the lower edge of the second thermal management device 512-2 may be oriented at a different angle relative to the light engine 506 than the lower edge of the second dual expansion grating area 508-2.

Figures 1, 6:
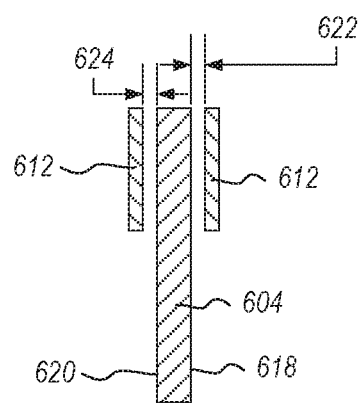
Figures 2, 6:
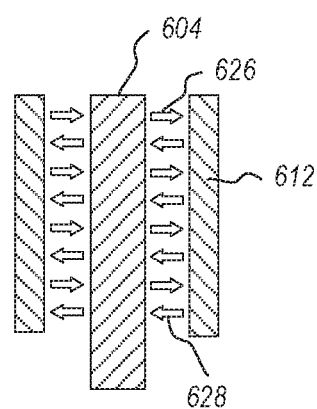
Figures 3, 6:
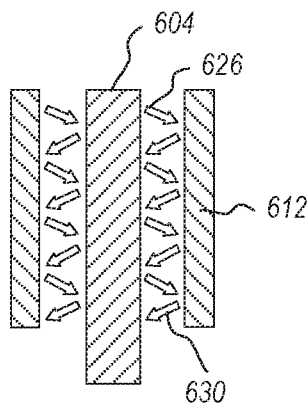
Figure 8:
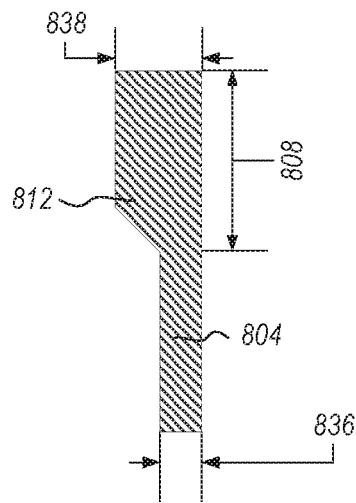
FIG. 8 is a side cross-sectional view of another embodiment of a waveguide with an integral thermal management device, according to at least one embodiment of the present disclosure.

FIG. 6-1 through FIG. 8 are side cross-sectional views of embodiments of waveguides and thermal management devices. FIG. 6-1 is a side cross-sectional view of an embodiment of a waveguide 604 with a thermal management device 612 that is symmetrical on the front and back of the waveguide 604. In some embodiments, the thermal management device 612 may be positioned proximate a front surface 618 of the waveguide 604 and proximate a rear surface 620 of the waveguide 604. In other embodiments, the thermal management device 612 may be positioned proximate a front surface 618 of the waveguide 604 only. In yet other embodiments, the thermal management device 612 may be positioned proximate a rear surface 620 of the waveguide 604 only.

In some embodiments, a portion of the thermal management device 612 may be positioned proximate a front surface 618 of the waveguide 604 and spaced apart from the front surface 618 by a front gap 622. As the waveguide 604 directs light via total internal reflection, the optics of the total internal reflection are based at least partially on the index of refraction between the waveguide 604 and the air around the waveguide 604. Contact between the thermal management device 612 and the waveguide 604, therefore, may adversely alter the optics of the waveguide 604.

In some embodiments, the front gap 622 may be in a range having an upper value, a lower value, or upper and lower values including any of 0.1 mm, 0.25 mm, 0.5 mm, 0.75 mm, 1.0 mm, 1.5 mm, 2.0 mm, 2.5 mm, 3.0 mm, or any values therebetween. For example, the front gap 622 may be greater than 0.1 mm. In other examples, the front gap 622 may be less than 3.0 mm. In yet other examples, the front gap 622 may be between 0.1 mm and 3.0 mm. In further examples, the front gap 622 may be between 0.25 mm and 2.5 mm. In yet further examples, the front gap 622 may be between 0.5 mm and 2.0 mm.

In some embodiments, a portion of the thermal management device 612 may be positioned proximate a rear surface 620 of the waveguide 604 and spaced apart from the rear surface 620 by a rear gap 624. In some embodiments, the rear gap 624 may be in a range having an upper value, a lower value, or upper and lower values including any of 0.1 mm, 0.25 mm, 0.5 mm, 0.75 mm, 1.0 mm, 1.5 mm, 2.0 mm, 2.5 mm, 3.0 mm, or any values therebetween. For example, the rear gap 624 may be greater than 0.1 mm. In other examples, the rear gap 624 may be less than 3.0 mm. In yet other examples, the rear gap 624 may be between 0.1 mm and 3.0 mm. In further examples, the rear gap 624 may be between 0.25 mm and 2.5 mm. In yet further examples, the rear gap 624 may be between 0.5 mm and 2.0 mm.

In some embodiments, the front gap 622 may be larger than the rear gap 624. In other embodiments, the rear gap 624 may be larger than the front gap 622. In at least one embodiment, the front gap 622 and rear gap 624 may be the same.

FIGS. 6-2 and 6-3 illustrate different passive thermal management mechanisms to reduce a thermal gradient and/or create an isothermal region of the waveguide 604. In some embodiments, the waveguide 604 may radiate thermal energy. The input thermal radiation 626 from the waveguide 604 may be absorbed by the thermal management device 612. In some embodiments, the thermal management device 612 may include a heat spreader, such as a metal, a metal alloy, a polymer, a fluid, or any other thermal conductive material capable of absorbing and spreading the thermal energy within the thermal management device 612. For example, a thermal management device 612 may include copper, aluminum, diamond, graphite, graphene, or other thermally conductive material to spread the thermal energy across the thermal management device 612.

The thermal management device 612 may radiate the thermal energy in an output thermal radiation 628 that is received by the waveguide 604. The absorption, spreading, and radiation of the thermal energy by the thermal management device 612 may passively redistribute the thermal energy of the waveguide 604 to reduce a thermal gradient in the waveguide 604 and/or create an isothermal region of the waveguide 604.

FIG. 6-3 illustrates another mechanism by which the thermal management device 612 may reduce a thermal gradient in the waveguide 604 and/or create an isothermal region of the waveguide 604. In some embodiments, the waveguide 604 may radiate an input thermal radiation 626 outward toward the thermal management device 612. The thermal management device 612 may reflect at least a portion of the input thermal energy 626 as a reflected thermal energy 630 without absorption and radiation of the thermal energy. The reflection of the input thermal radiation 626 emitted from the waveguide 604 may reduce a thermal gradient in the waveguide 604 and/or create an isothermal region of the waveguide 604.

Figure 7:
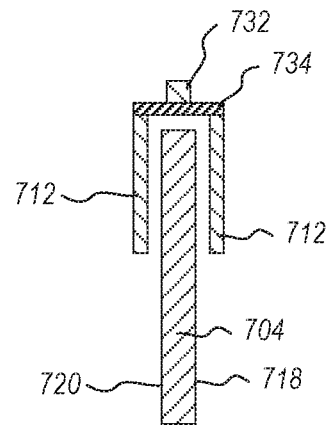
FIG. 7 is a side cross-sectional view of another embodiment of a waveguide with a thermally insulated thermal management device, according to at least one embodiment of the present disclosure.

In some embodiments of a passive thermal management device, a thermal gradient may form within the thermal management device that may reduce the effectiveness of the passive thermal management. A thermal gradient may form in the thermal management device, if the thermal management device is connected to a support that may act as a heatsink. For example, FIG. 7 is a side cross-sectional view of an embodiment of a waveguide 704 with a thermal management device 712 overlapping at least a portion of the front surface 718 and a rear surface 720. In some embodiments, the thermal management device 712 may be a thermal conductive material, as described herein. The thermal management device 712 may be connected to a support 732. In some embodiments, the support 732 may be part of the frame of a HMD. In other embodiments, the support 732 may also support the waveguide 704. In yet other embodiments, the support may be the light engine.

In embodiments with a thermally conductive support 732, the support 732 may behave as a heatsink, conducting thermal energy from the thermal management device 712 and inducing a thermal gradient in the thermal management device 712. To limit and/or prevent the creation of a thermal gradient in the thermal management device 712, a thermal insulation layer 734 may be positioned between the thermal management device 712 and the support 732. In some embodiments, the thermal insulation layer 734 may include any thermally insulating material, such as a polymer (e.g., a polyimide film such as KAPTON, expanded polystyrene foam) or such as organic or inorganic fibers.

FIG. 8 is a side cross-sectional view of yet another embodiment of a waveguide 804 with a thermal management device 812. In some embodiments, the thermal management device 812 may be integral to the waveguide 804. For example, the waveguide 804 may have a first thickness 836, where the thermal management device 812 may be a portion of the waveguide 804 with a second thickness 838 that is greater than the first thickness 836.

In some embodiments, a thermal gradient may develop in the waveguide 804, or specifically in the dual expansion grating area 808 of the waveguide 804, because the waveguide absorbs from the surrounding environment and/or radiates to the surrounding environment thermal energy. In some embodiments, the greater second thickness 838 may increase the thermal capacity of the waveguide 804 in the region with the second thickness 838. For example, the depicted embodiment has a second thickness 838 in the dual expansion grating area 808.

In some examples, the increased thermal capacity may spread the thermal energy within the thermal management device 812 and inhibit changes in the temperature, and hence the creation of thermal gradients, within the waveguide 804 relative to an area with the thinner first thickness 836. In at least one example, the second thickness 838 may be 0.50 mm.

In other embodiments of thermal management devices, active thermal management may allow for control over heating and/or cooling of the waveguide to reduce thermal gradients and/or create an isothermal region of the waveguide. While a particular temperature may not be more or less desirable than another particular temperature for the purposes of optical performance, active thermal management may provide more rapid reduction of thermal gradients than passive thermal management. For example, during initial startup or the device, one or more components of a HMD may radiate thermal energy proximate a portion of the waveguide while the remainder of the waveguide remains at or near ambient temperature. Active thermal management may equalizer the resulting thermal gradient faster than passive thermal management.

Figure 9:
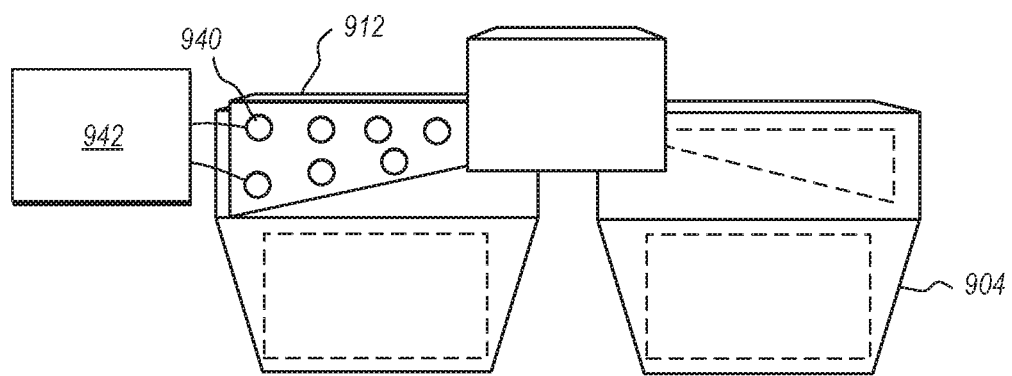
FIG. 9 is a front view of an embodiment of a waveguide with an active thermal management device, according to at least one embodiment of the present disclosure.

FIG. 9 is a front view of an embodiment of a waveguide 904 including a thermal management device 912 with a plurality of temperature control devices 940, such as heaters. For example, the temperature control devices 940 may be resistive heaters that emit thermal energy upon application of an electric current. In other embodiments, the thermal management device 912 may include a plurality of coolers. For example, the temperature control devices 940 may be liquid cooling pipes that conduct thermal energy away from a body of the thermal management device 912. In other examples, the temperature control devices 940 may be Peltier coolers that may cool the thermal management device electrically. In yet other embodiments, an active thermal management device 912 may include both heaters and coolers.

In some embodiments, the temperature control devices 940 may include thermocouples or other sensors to provide information regarding the temperature of the thermal management device 912 and/or the waveguide 904. For example, each of the temperature control devices 940 may include a thermocouple, allowing the thermal management device 912 to detect and/or communicate to controller 942 a temperature or thermal gradient. Thermocouples spread throughout the thermal management device 912 and/or waveguide 904 may be used to determine and counteract non-uniform temperature.

Figure 10:
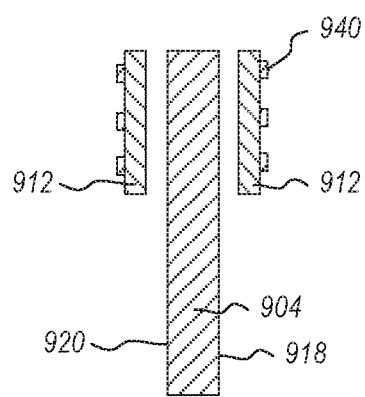
FIG. 10 is a side cross-sectional view of the embodiment of a waveguide of FIG. 9, according to at least one embodiment of the present disclosure.

FIG. 10 is a side cross-sectional view of the embodiment of a waveguide 904 of FIG. 9. In some embodiments, the thermal management device 912 may be positioned overlapping at least a portion of the front surface 918 and/or rear surface 920 of the waveguide 904. The temperature control devices 940 may be located on an outer surface (e.g., away from the waveguide 904) of the thermal management device 912. In other embodiments, the temperature control devices 940 may be located in the thermal management device 912 such that the temperature control devices 940 may be proximate the waveguide 904 and/or flush with the thermal management device 912.

Figure 11:
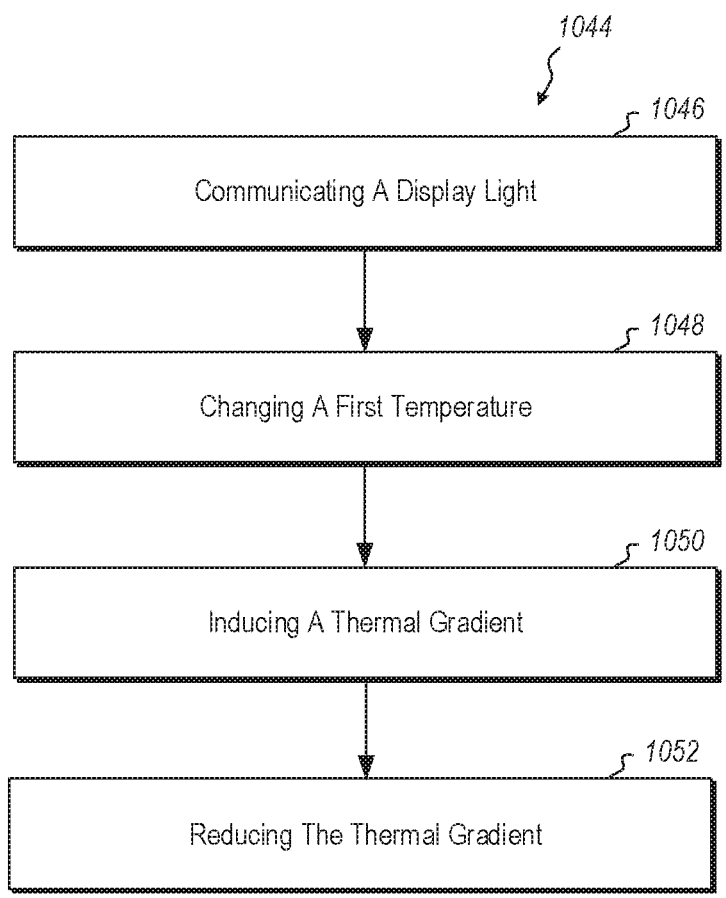
FIG. 11 is a flowchart illustrating an embodiment of a method of displaying visual information to a user, according to at least one embodiment of the present disclosure.

FIG. 11 is a flowchart illustrating an embodiment of a method 1044 of displaying visual information to a user. In some embodiments, the method 1044 may include communicating a display light into a waveguide with a dual expansion grating area at 1046. For example, the display light may be provided by a light engine or other projection device configured to generate visual information. The display light may be in coupled to the waveguide, and the waveguide may direct the light along a length of the waveguide.

The method may further include changing a first temperature of a first portion of the dual expansion grating area at 1048 and inducing a thermal gradient relative to a second portion in the dual expansion grating area with a lower second temperature at 1050. In some embodiments, the thermal gradient in the waveguide may be induced by exposure to heat thermal energy from the light engine or other electronic components in a HMD. For example, any nearby electronic component that generates thermal energy during use may introduce thermal energy to the waveguide 304 and induce a thermal gradient. The packaging of electronic components may vary from device to device, but a power supply, processor, storage device, memory module, communication device, or other electronic components may be positioned in proximity to the waveguide. In other examples, the thermal gradient may be introduced by thermal energy from a user, such as body heat, or from the environment, such as exposure to direct sunlight.

The method may further include reducing thermal gradient 1052. In some embodiments, a thermal management device may reduce the thermal gradient and/or create an isothermal region of the waveguide by moving thermal energy within the waveguide and/or changing the total thermal energy of the waveguide. The thermal management device may move or change the thermal energy passively or actively.

In some embodiments, the thermal management device may be a passive heat spreader that assists in moving thermal energy from the first portion to the second portion of the dual expansion grating area. For example, the thermal management device may passively absorb thermal energy radiated by the first portion, conduct the thermal energy through the thermal management device, and radiate the thermal energy proximate the second portion. In other embodiments, the thermal management device may reflect at least a portion of the thermal energy radiated by the first portion. Some of the reflected heat may be absorbed by the second portion.

In yet other embodiments, the thermal management device may be an active thermal management device, such as described herein. For example, the thermal management device may include one or more temperature control devices that may selectively apply or extract thermal energy from the thermal management device to actively heat or cool the waveguide. In at least one example, the active thermal management device may include thermocouples to monitor the temperature and/or thermal gradient of the waveguide and adjust the heating and/or cooling of the temperature control devices.

Figure 12:
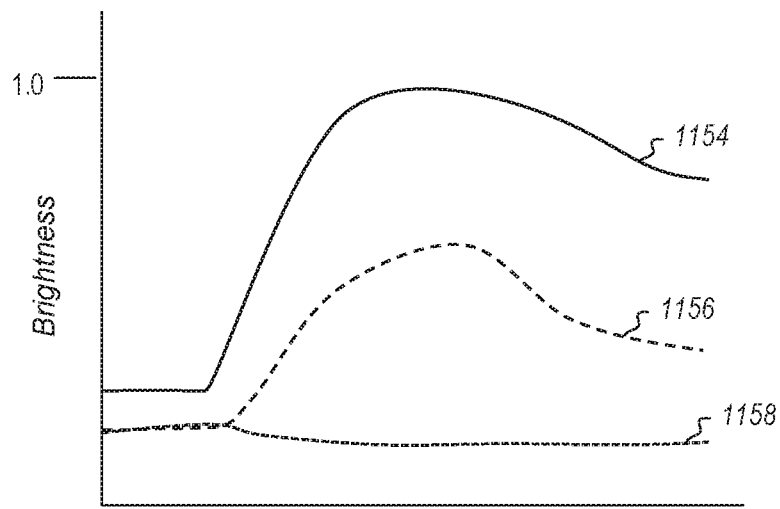
FIG. 12 is a chart comparing experimental results of a waveguide brightness using different embodiments of thermal management devices.

FIG. 12 is a graph depicting experimental results using a passive heat spreader. The graph illustrates the changes in optical power of the transmitted visual information versus time as the waveguide heats up from the operations of a HMD. The baseline 1154 shows the changes in optical power in a waveguide without any thermal management device present. A partial management 1156, such as the partially overlapping thermal management device of FIG. 4, provides a partial reduction in optical power changes. A full-overlap passive thermal management device produces a full management 1158 that is approximately flat, minimizing all or nearly all change in optical power due to thermal gradients during operation.

In at least one embodiment, a thermal management device according to the present disclosure may reduce or eliminate thermal gradients in a dual expansion grating area of a waveguide. The reduction or elimination of the thermal gradients may improve the optical qualities of the dual expansion grating area, thereby improving the brightness and/or color control of the visual information presented to a user by the waveguide.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A system for displaying visual information to a user, the system including:
   a waveguide having a front surface, a rear surface, and a dual expansion grating area having a dual expansion grating; and
   a thermal management device positioned at least partially overlapping the dual expansion grating area and in thermal communication with the dual expansion grating area and the thermal management device not contacting the dual expansion grating area.

2. The system of claim 1, the thermal management device including a heat spreader.

3. The system of claim 1, the thermal management device having a thermal mass greater than the waveguide in the dual expansion grating area.

4. The system of claim 1, the thermal management device positioned proximate the front surface and overlapping 100% of the dual expansion grating area.

5. The system of claim 1, the thermal management device positioned proximate the rear surface and overlapping 100% of the dual expansion grating area.

6. The system of claim 1, the thermal management device overlapping the dual expansion grating area symmetrically proximate the front surface and the rear surface.

7. The system of claim 1, the thermal management device not contacting the front surface or the rear surface.

8. The system of claim 7, the thermal management device having a front gap from the front surface between 10 micrometers (μm) and 3 millimeters (mm).

9. The system of claim 7, the thermal management device having a rear gap from the rear surface between 10 micrometers (μm) and 3 millimeters (mm).

10. The system of claim 1, the thermal management device being optically transparent.

11. The system of claim 1, the thermal management device including a thicker region of the waveguide in at least a portion of the dual expansion grating area.

12. The system of claim 1, the thermal management device including a heat source configured to heat at least a portion of the dual expansion grating area.

13. The system of claim 1, the thermal management device having at least one thermal sensor connected thereto.

14. The system of claim 1, the thermal management device being complimentarily shaped with the dual expansion grating area.

15. A system for displaying visual information to a user, the system including:
   a head-mounted display frame;

a waveguide supported by the head-mounted display frame, the waveguide having a front surface, a back surface, and a dual expansion grating area having a dual expansion grating;

a display engine in optical communication with the waveguide and configured to communicate a display light into the dual expansion grating area of the waveguide; and a heat spreader positioned at least partially overlapping the dual expansion grating area, in thermal communication with the dual expansion grating area and not contacting the dual expansion grating area.

16. The system of claim 15, the heat spreader being coupled to a support, the heat spreader being thermally insulated from the support.

17. A method of displaying visual information to a user, the method including:

communicating a display light into a waveguide having a dual expansion grating area having a dual expansion grating;

changing a first temperature of a first portion of the dual expansion grating area;

inducing a thermal gradient such that a second portion of the dual expansion grating area has a second temperature that is different from the first temperature; and reducing the thermal gradient of the first temperature of the first portion and the second temperature of the second portion.

18. The method of claim 17, further comprising creating an isothermal region of the dual expansion grating area.

19. The method of claim 17, reducing the thermal gradient including moving heat between the first portion of the dual expansion grating area and the second portion of the dual expansion grating area with a heat spreader.

20. The method of claim 17, reducing the thermal gradient including applying heat to one of the first portion of the dual expansion grating area and the second portion of the dual expansion grating area.

* * * * *